United States Patent [19]

Hagin

[11] Patent Number: 4,860,796

[45] Date of Patent: Aug. 29, 1989

[54] SOLVENT WELD PIPE TEST DISK

[76] Inventor: Roy Hagin, 33 Agate Rd., East Brunswick, N.J. 08816

[21] Appl. No.: 915,656

[22] Filed: Oct. 6, 1986

[51] Int. Cl.⁴ .............................................. F16L 55/00
[52] U.S. Cl. ...................................... 138/90; 73/49.1; 73/49.5; 73/40.5 R
[58] Field of Search ................ 138/89, 90; 73/40.5 R, 73/49.1, 49.5

[56] References Cited

U.S. PATENT DOCUMENTS

| | | | |
|---|---|---|---|
| 2,886,067 | 5/1959 | Maxwell et al. | 138/90 |
| 3,134,515 | 5/1964 | Callahan, Jr. | 73/49.1 |
| 3,884,070 | 5/1975 | Windle | 73/49.5 |
| 4,122,592 | 10/1978 | Ehret et al. | 138/90 X |
| 4,620,330 | 11/1986 | Izzi, Sr. | 138/89 X |

Primary Examiner—Stephen Marcus
Assistant Examiner—Christine A. Peterson
Attorney, Agent, or Firm—Arthur L. Plevy

[57] ABSTRACT

A pipe test disk has a planar disk portion having a lower circumferential edge portion which is joined to a pipe end and an upper circumferential edge portion which is joined to a fitting, a center portion through which an opening is formed for inlet of fluid to pressurize the pipe for testing, and a coupling pipe portion surrounding the center portion and extending upwards from the disk portion for coupling to an external fluid pressurizing apparatus. The pipe end, test disk, and fitting are solvent welded together. When the testing is completed, the coupling pipe portion is broken off and the disk portion is cut out to leave an open passage between the pipe end and the fitting.

12 Claims, 2 Drawing Sheets

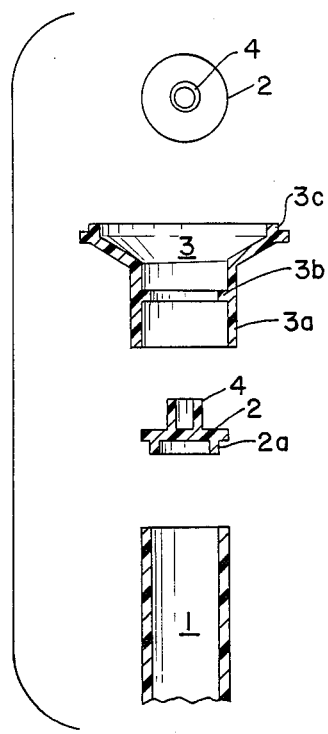
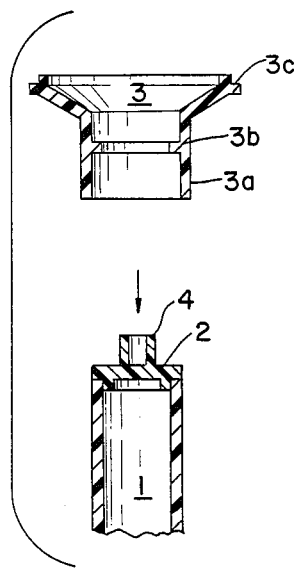
FIG. 1
FIG. 2
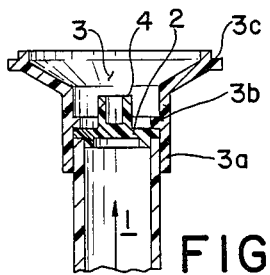
FIG. 3
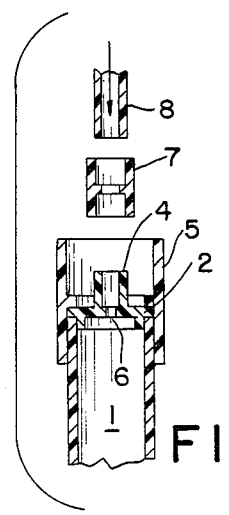
FIG. 4
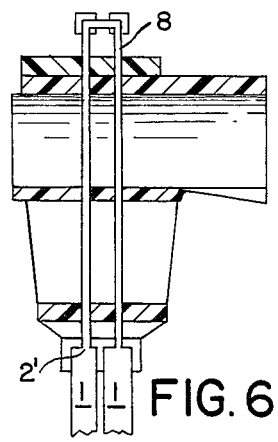
FIG. 6

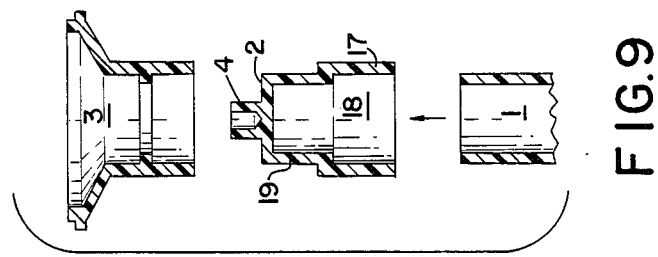
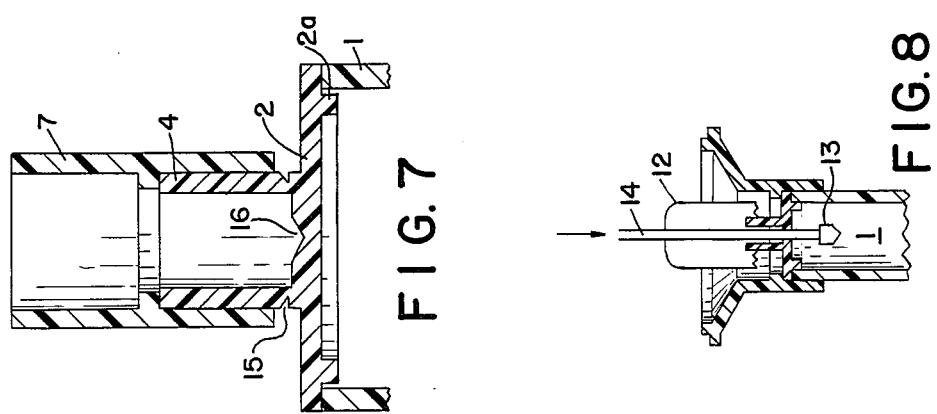
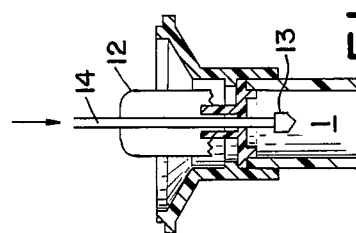
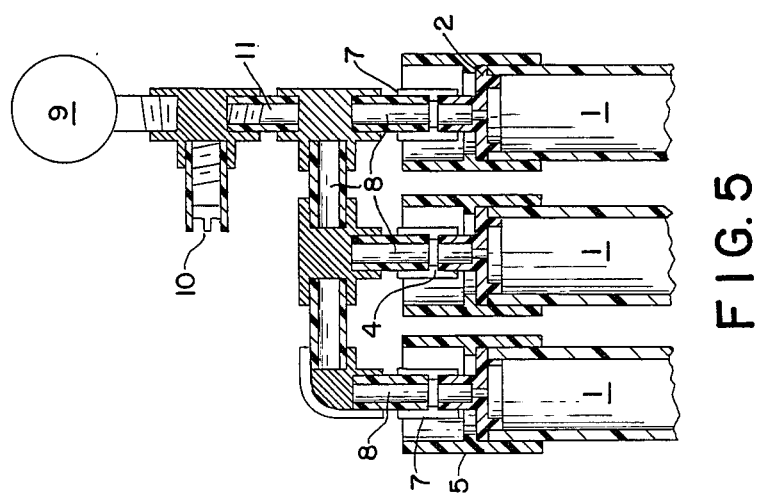

SOLVENT WELD PIPE TEST DISK

BACKGROUND OF THE INVENTION

This invention relates to a pipe testing method and apparatus for testing pipes and fittings, and particularly, to a pipe test disk which is solvent welded to a polyvinyl chloride (PVC) pipe and fitting for pressure testing and subsequently removed therefrom.

BACKGROUND OF INVENTION

In swimming pools and other environments where pipes are embedded in the ground, the piping, inlet fittings, and skimmers are placed in their final position by the plumber before the concrete or ground material is placed. The open ends of the pipes are then plugged with screw plugs or rubber expansion plugs, and fluid, i.e. water or air, pressure is then applied to the pipe system to test it for possible leaks.

Conventional test plugs and pressure test methods have the following problems and disadvantages. For some pool fittings, a membrane is molded in the pool fitting which is used to seal the pipe opening until it is drilled or knocked out. A manufacturer is required to manufacture pool fittings with and without the membrane, the distributor has to stock both types, or if only membrane fittings are supplied, the plumber must cut the membrane if the fitting is to be used without pipe testing. The molding of the membrane to the fitting also has the problem that, if it is too thick, damage may occur to the pipe when it is knocked or drilled out, and if it is too thin, it may fail because of the seal being broken by test pressure. The membrane is also weakened by fumes from the primer and solvent used for the pipes and fittings.

Rubber expansion plugs, as conventionally used, have the problem that they tend to leak after a day or so, and are dangerous to use with air pressure of over 15 pounds per square inch. Expansion plugs which can hold higher pressures are very costly and are not used for testing pool piping. Threaded plastic plugs sealed with Teflon tape are also use, but are costly and not very good for test purposes. The plugs usually must be tightened and the test pressure brought back up every few days.

Another conventional pipe test method is to extend the pipe end into the air above the concrete and fit it with a standard pipe cap. Although this provides a good seal, a hole must be cut in the concrete around the pipe, and before the pool is completed, the pipe must be cut back and an inlet fitting must be solvent welded onto the pool skimmer and drain bottom, thereby entailing extra effort and expense.

SUMMARY OF INVENTION

In accordance with one embodiment of the invention, a pipe test disk comprises a planar disk portion having a lower circumferential edge portion which is joined to a pipe end and an upper circumferential edge portion which is joined to a fitting, a center portion in which a central opening is formed for inlet of fluid to pressurize the pipe for testing, and a coupling pipe portion surrounding the center portion and extending upwards from the disk portion for coupling to an external fluid pressurizing apparatus. Further features include a break-away groove formed circumferentially around the coupling pipe portion of the pipe test disk proximate the planar disk portion, and a central well in the upper surface of the planar disk portion for centering a hole saw to cut a hole through the planar disk portion when testing has been completed.

The invention also includes a preferred pipe test assembly comprising a pipe having an open end and provided with a given outside diameter, a pipe test disk as described above having a planar disk portion of the given outside diameter, and the fitting has a lower coupling portion having an inner diameter corresponding to the given outside diameter for fitting onto the pipe end and planar disk portion of the pipe test disk, an intermediate collar on the inside wall of the fitting against which the upper circumferential edge portion of the pipe test disk is abutted and joined thereto, the collar defining an opening through which the coupling pipe portion of the pipe test disk projects upwardly, and an upper inlet portion.

Another embodiment of the pipe test disk and testing assembly includes the pipe test disk having a lower coupling portion provided with an inner shoulder having an inner diameter corresponding to the inner diameter of the pipe end, and an enlarged end portion having an inner diameter corresponding to the outside diameter of the pipe, wherein the lower coupling portion is fitted on the pipe end abutting the inner shoulder.

A pipe testing method according to the invention includes the steps of forming the above assembly by solvent welding the pipe end, pipe test disk, and fitting together, testing the assembly by pressurizing it, then after completion of testing, removing the coupling pipe portion and forming an open passage through the planar disk portion of the pipe test disk by cutting it away.

BRIEF DESCRIPTION OF FIGURES

FIG. 1 is a cross-sectional view of a pipe test disk for assembly with a pipe end and an inlet fitting in accordance with the invention;

FIG. 2 is a cross-sectional view of the pipe test disk of FIG. 1 joined to the pipe end;

FIG. 3 is a cross-sectional view of the pipe test disk of FIG. 1 with the inlet fitting joined thereto;

FIG. 4 is a cross-sectional view showing a connecting pipe joined to the pipe test assembly;

FIG. 5 is a cross-sectional view showing a system for pressure testing a plurality of pipe test assemblies;

FIG. 6 is a cross-sectional view showing a dual pipe test assembly in accordance with another use of the invention;

FIG. 7 is a cross-sectional view showing the pipe test disk of the invention with structural features for removing it after completion of testing;

FIG. 8 is a cross-sectional view showing the pipe test disk being removed by hole-sawing; and FIG. 9 is an alternate embodiment of the pipe test disk having an integral lower coupling for the pipe end.

DETAILED DESCRIPTION OF INVENTION

Referring to FIG. 1 there is shown a pipe test disk according to the invention which has a planar disk portion 2 and an integral, upper coupling portion 4 in the form of an upright tubular pipe around a center portion of the disk. The disk is to be joined to the open end of a pipe 1. The outside diameter of the disk portion 2 is equal to the outside diameter of the pipe 1, so that the lower circumferential edge portion of the disk portion 2 abuts flush on the pipe end. The disk portion 2 has an integral sealing ring formed as a recessed shoulder 2a on its lower surface for fitting inside the open end of the pipe 1. The diameter of the sealing ring 2a can be made smaller then the inside diameter of the pipe in order to provide a loose fit for accommodating a possibly uneven cut of pool pipe.

A pool inlet fitting 3 has a lower portion 3a with an inner diameter equal to the outside diameter of the pipe end and the disk portion 2 for fitting over them, a collar 3b on its inside wall for abutting the upper surface of the disk portion 2, and an upper, inlet portion 3c.

For swimming pools, standard polyvinyl chloride (PVC) pipes and fittings are used. The test disk 2 is made compatible with standard pool equipment and PVC pipes and fittings now in use. The standard equipment uses 0.5 inch PVC pipe diameters.

The pipe end 1 is assembled to the pipe test disk 2 and the pool fitting 3 by first priming the end of the pipe, the pipe test disk, and the fitting with purple primer (methyl ethyl ketone). Then the surface of the pipe which will abut the test disk 2 and the abutting lower surface of the test disk 2 are coated with solvent cement. The test disk 2 is then placed on the end of the pipe 1, as shown in FIG. 2. Next the inside of the lower coupling portion of the inlet fitting 3 is coated with solvent cement, and the outside of the pipe end is likewise coated taking care to cover the joint between the pipe end and the test disk 2. The pipe end and disk are quickly pushed into the coupling portion of the inlet fitting, turned 90 degrees, and held for several seconds until the assembly is bonded, as shown in FIG. 3. The solvent cement will form a bead between the inside surface of the inlet fitting 3 and the upper surface of the disk 2, and also between the outer surface of the sealing ring 2a and the inner wall of the pipe to prevent leaks.

With the above assembly, the inlet fitting is now plugged and will hold the test pressure when the other assemblies of the pool pipe system are similarly completed and the system is pressurized.

At locations of the pool pipe system where filters are to be installed, the pipes will be continued, i.e. joined to another pipe end. To plug the ends of pipes at these locations, a standard PVC pipe coupling 5 and the test disk 2 are used, as shown in FIG. 4. The test disk 2 and pipe coupling 5 are welded on the pipe end 1 in the same manner as described for the inlet fitting 3 shown in FIGS. 1–3.

In order to conduct a pressure test of the pipe system with the pipe ends sealed by the above-described assemblies, a hole 6 for the pressurizing fluid, i.e. air or water, is formed by drilling in the center of the disk portion 2. A 0.5 inch PVC pipe coupling is solvent welded onto the integral coupling portion 4 of the test disk, and a connecting 0.5 inch pipe 8 is welded into the coupling 7, as further shown in FIG. 4. The pipe end assemblies with the connecting pipes 8 formed for the pool pipe system are then connected to a pressurizing system for the test. As shown in FIG. 5, the pressurizing system includes a test gauge tank 9, an air tank valve 10 through which air pressure is applied and measured for three or more pool pipe lines 1, and a PVC nipple 11 which is solvent welded into the top of a Tee connector for the connecting pipes 8 of the pipe test assembly. In place of air valve 10, a standard garden hose valve may be used for applying water pressure.

The entire pipe system using the invention can remain under pressure for months, if necessary, with no leakage, so that it can be checked by an inspector, pool owner, or contractor during construction. Thus, the integrity of the pool pipe system can be monitored over the period when concrete is placed, when vandals may cause damage, or even if construction is delayed over winter months.

In FIG. 6, a two hold skimmer fitting is shown plugged using a dual opening test disk 2' and connecting pipes 8 for two pipe ends 1, in substantially the same manner as for the inlet and coupling fittings described above.

After pool construction is completed and before the pool is filled, the test pressure is released through the valve 10, and the pressurizing system is disconnected. The test disks are then removed by cutting away an open passage with a hole saw 12, as shown in FIG. 8. The standard twist drill that is supplied with the hole saw is replaced with a standard cement drill 13, which has a curing end slightly larger than the drill rod end 14. When the cut-away portion of the test disk is cut through by the hole saw 12, it is retained by and prevented from slipping over the drill end 13 and falling into the pool pipe.

A further feature of the invention, as shown in FIG. 7, is the provision of a weakening groove 15 cut part way into the wall of the coupling portion 4 near the planar disk portion of the test disk 2, so that the coupling end 4 and the connecting pipe 8 welded therein can be broken off by pushing the pipe 8 back and forth. Flexible plastic pipe can be substituted for standard PVC for the connecting pipe 8, in order to avoid any risk that the pipe 8 projecting above the surface of the concrete may be broken off at weakening groove 15 by accident. A center guide point 16 is also provided for centering the hole saw and preventing it from damaging the pipe 1.

In FIG. 9, an alternative embodiment of the test disk 2 is similar to the one described above, except that it has an enlarged end 17 on a lower coupling portion 18 for receiving the end of the pipe 1. The pipe end is inserted therein until it abuts the walls of the same-diameter portion 19. The coupling portion 18 makes assembly of the disk to the pipe end easier and more convenient. With the first embodiment, the pipe end must be cut squarely in order to have the disk seated properly thereon. For field use where the pipe ends may not be cut squarely, the coupling portion 18 will avoid the possibility of leaking by forming a male-female type coupling with the pipe end. The portion 19 may also be molded with external threads so that it can be threaded into the female threaded end of a fitting 3 without the need for an adapter. Alternatively, the coupling end 18 may be molded with a reduced-diameter, threaded insert end instead of the enlarged receiving end 17.

The invention and the embodiments thereof described above will provide a good seal against leaks for test purposes and the least expensive, most convenient way to install the test disk on the pipe ends. The solvent welding of the disks between the pipe ends and fittings ensure that the disks are securely bonded and will hold test pressures of 40 pounds per square inch or more. Also, the fittings or pipe couplings can be installed in place in the concrete with the test disks, so that the pool pipe system can be tested over a long period if desired, and the time and expense of cutting the pipe ends and installing couplings or fittings after construction is completed can be avoided.

I claim:

1. A pipe test disk, for use in pressure testing the integrity of a pipe end joined to a fitting comprising:

a planar disk portion having opposite lower and upper surfaces, said lower surface being continuous and having a lower circumferential edge portion which is permanently joined to the pipe end, and said upper surface being continuous and having an upper circumferential edge portion which is permanently joined to the pipe fitting, whereby said planar disk portion extends completely across said pipe end and said fitting, a center portion of said planar disk portion in which a center opening is to be formed through said planar disk portion for inlet of fluid to pressurize the pipe for testing and a coupling pipe portion integrally formed with said planar disk portion surrounding the center portion thereof, said coupling pipe portion having a passageway provided with an open end, which is remote from said planar disk portion, and another end, which is opposite to said open end and which is closed off by the center portion of said planar disk portion, whereby said pipe test disk plugs said pipe end as well as said fitting, and extending upwards from the upper surface of said planar disk portion for coupling said pipe portion of said pipe test disk and the pipe end joined to said lower surface of said pipe test disk to an external fluid pressurizing apparatus whereby after a pressure test is completed a portion of said planar disk portion remains joined between said pipe end and said pipe fitting and communication therebetween is afforded by a formed center opening.

2. A pipe test disk according to claim 1, wherein said coupling pipe portion is formed by a tubular wall and has a weakening groove cut part way into said tubular wall circumferentially around the coupling pipe portion proximate said planar disk portion, for allowing said coupling pipe portion to be removed by breaking it away at said weakening groove after the pressure testing is completed.

3. A pipe test disk according to claim 1, further comprising a central well indented in the upper surface of said center portion of said planar disk portion, for centering a hole saw therein to cut an open passage through said planar disk portion when the pressure testing is completed.

4. A pipe test disk according to claim 1, wherein said lower surface of said planar disk portion has a sealing ring integrally formed thereon which is recessed radially inwardly from said lower circumferential edge portion so as to provide a sealing surface for the pipe end joined thereto.

5. A pipe test assembly, for use in pressure testing the integrity of a pipe end joined to a fitting, comprising:

a pipe test disk including: a planar disk portion having opposite lower and upper surfaces, said lower surface being continuous and having a lower circumferential edge portion which is permanently joined to the pipe end, and said upper surface being continuous and having an upper circumferential edge portion which is permanently joined to the pipe fitting, whereby said planar disk portion extends completely across said pipe end and said fitting; a center portion of said planar disk portion in which a center opening is to be formed through said planar disk portion for inlet of fluid to pressurize the pipe for testing; and a coupling pipe portion integrally formed with said planar disk portion surrounding the center portion thereof, said coupling pipe portion having a passageway provided with an open end, which is remote from said planar disk portion, and another end, which is opposite to said open end and which is closed off by the center portion of said planar disk portion, whereby said pipe test disk plugs said pipe end as well as said fitting, and extending upwards from the upper surface of said planar disk portion, for coupling said pipe portion of said pipe test disk and the pipe end joined to said lower surface of said pipe test disk to an external fluid pressurizing apparatus;

the pipe end being joined to said lower circumferential edge portion of said lower surface of said pipe test disk; and the fitting having a lower coupling portion which is joined to said upper circumferential edge portion of said upper surface of said pipe test disk whereby after said pressure test is completed a portion of said planar disk portion remains joined between said pipe end and said pipe fitting and communication therebetween is afforded by a formed center opening.

6. A pipe test assembly according to claim 5, wherein said pipe end has a given outside diameter, said planar disk portion has said given outside diameter and is joined to said pipe end flush therewith, said lower coupling portion of said fitting is a pipe portion having an inner diameter corresponding to the given outside diameter for fitting onto said pipe end and planar disk portion of said pipe test disk.

7. A pipe test assembly according to claim 6, wherein said fitting further includes a collar portion on the inside wall of said pipe portion against which said upper circumferential edge portion of said pipe test disk is abutted and joined thereto, said collar defining an opening through which said coupling portion of said pipe test disk projects upwardly, and an upper inlet fitting portion.

8. A pipe test assembly according to claim 5, wherein said fitting is a coupling fitting for joining said pipe end to another pipe end.

9. A pipe test assembly according to claim 5, further comprising a second pipe end in parallel with said first-mentioned pipe end, and wherein said pipe test disk includes a second coupling pipe portion extending upwards in parallel with said first-mentioned coupling pipe portion.

10. A pipe test assembly according to claim 5, wherein said pipe end, pipe test disk, and fitting are joined together by solvent welding.

11. A pipe testing method, for use in pressure testing the integrity of a pipe end joined to a fitting, comprising:

providing a pipe test disk which has a planar disk portion having opposite lower and upper surfaces, a center portion of said planar disk portion in which a central opening is to be formed through said planar disk portion, and a coupling pipe portion surrounding said center portion extending upwards from the upper surface of said planar disk portion;

solvent welding the pipe end to the lower surface of the pipe test disk;

solvent welding the fitting to the upper surface of said pipe test disk;

forming a hole in the center portion of the pipe test disk;

connecting the coupling pipe portion of the pipe test disk to an external fluid pressurizing apparatus, and conducting the pressure test; and after completion of testing, disconnecting the fluid pressurizing apparatus, removing the coupling pipe portion by breaking it off proximate the planar disk portion, then cutting an open passage through the planar disk portion of the pipe test disk.

12. A pipe testing method, for use in pressure testing the integrity of a pipe end joined to a fitting, comprising:

providing a pipe test disk which has a planar disk portion having opposite lower and upper surfaces, said lower surface being continuous and having a lower circumferential edge portion which is permanently joined to the pipe end, and said upper surface being continuous and having an upper circumferential edge portion which is permanently joined to the pipe fitting, whereby said planar disk portion extends completely across said pipe end and said fitting; a center portion of said planar disk portion in which a center opening is to be formed through said planar disk portion for inlet of fluid to pressurize the pipe for testing; and a coupling pipe portion integrally formed with said planar disk portion surrounding the center portion thereof, said coupling pipe portion having a passageway provided with an open end, which is remote from said planar disk portion, and another end, which is opposite to said open end and which is closed off by the center portion of said planar disk portion, whereby said pipe test disk plugs said pipe end as well as said fitting, and extending upwards from the upper surface of said planar disk portion, for coupling said pipe portion of said pipe test disk and the pipe end joined to said lower surface of said pipe test disk to an external fluid pressurizing apparatus;

permanently attaching the pipe end to the lower surface of the pipe test disk;

permanently attaching the fitting to the upper surface of the pipe test disk;

connecting the coupling pipe portion of the pipe test disk to an external fluid pressurizing apparatus, and conducting the pressure test; and after completion of test, disconnecting the fluid pressurizing apparatus and then removing at least a portion of the planar disk portion, including the coupling pipe portion thereof, so as to provide an open passage through the planar disk portion of the pipe test disk.

* * * * *